US010982519B2

(12) United States Patent
Kesavan et al.

(10) Patent No.: US 10,982,519 B2
(45) Date of Patent: Apr. 20, 2021

(54) POLYMER BLENDS FOR STIMULATION OF OIL AND GAS WELLS

(71) Applicant: RHODIA OPERATIONS, Paris (FR)

(72) Inventors: Subramanian Kesavan, East Windsor, NJ (US); Genyao Lin, The Woodlands, TX (US); Jian Zhou, Langhorne, PA (US); Hoang Van Le, Spring, TX (US); Changmin Jung, Lansdale, PA (US); Qi Qu, Spring, TX (US)

(73) Assignee: RHODIA OPERATIONS, Paris (FR)

(*) Notice: Subject to any disclaimer, the term of this patent is extended or adjusted under 35 U.S.C. 154(b) by 0 days.

(21) Appl. No.: 15/702,855

(22) Filed: Sep. 13, 2017

(65) Prior Publication Data
US 2018/0073340 A1 Mar. 15, 2018

Related U.S. Application Data

(60) Provisional application No. 62/394,342, filed on Sep. 14, 2016.

(51) Int. Cl.
| E21B 43/26 | (2006.01) |
| C09K 8/68 | (2006.01) |
| C09K 8/88 | (2006.01) |
| C09K 8/90 | (2006.01) |
| C09K 8/035 | (2006.01) |

(52) U.S. Cl.
CPC .............. *E21B 43/26* (2013.01); *C09K 8/035* (2013.01); *C09K 8/68* (2013.01); *C09K 8/685* (2013.01); *C09K 8/882* (2013.01); *C09K 8/887* (2013.01); *C09K 8/90* (2013.01); *C09K 2208/26* (2013.01); *C09K 2208/28* (2013.01)

(58) Field of Classification Search
None
See application file for complete search history.

(56) References Cited

U.S. PATENT DOCUMENTS

| 3,542,044 A | 11/1970 | Hollcong et al. |
| 3,841,402 A | 10/1974 | Knight et al. |
| 3,943,060 A | 3/1976 | Martin et al. |
| 4,624,795 A | 11/1986 | Dawson et al. |
| 4,683,068 A | 7/1987 | Kucera |
| 5,575,335 A | 11/1996 | King |
| 5,759,964 A | 6/1998 | Shuchart et al. |
| 6,787,506 B2 | 9/2004 | Blair et al. |
| 6,986,391 B2 | 1/2006 | Funkhouser et al. |
| 7,004,254 B1 | 2/2006 | Chatterji et al. |
| 7,530,393 B2 | 5/2009 | Wood et al. |
| 7,857,055 B2 | 12/2010 | Li |
| 8,022,015 B2 | 9/2011 | Carman et al. |
| 2004/0244975 A1 | 12/2004 | Heier et al. |
| 2006/0162928 A1* | 7/2006 | Collins ............... C09K 8/512 166/279 |
| 2009/0192058 A1 | 7/2009 | Carman et al. |
| 2010/0075871 A1 | 3/2010 | Engelhardt et al. |
| 2012/0006551 A1 | 1/2012 | Carman et al. |
| 2013/0255954 A1 | 10/2013 | Favero et al. |
| 2014/0251610 A1* | 9/2014 | Brannon ............ E21B 43/267 166/280.1 |
| 2016/0024375 A1 | 1/2016 | Li et al. |

FOREIGN PATENT DOCUMENTS

| GB | 2420577 B | 9/2009 |
| WO | 2003085232 A1 | 10/2003 |
| WO | 2013043243 A1 | 3/2013 |
| WO | 2015171130 A1 | 11/2015 |

* cited by examiner

*Primary Examiner* — Jeffrey D Washville
(74) *Attorney, Agent, or Firm* — Osha Bergman Watanabe & Burton LLP

(57) ABSTRACT

Compositions and methods for fracturing a subterranean formation are presented. Also provided are compositions and methods for reducing friction-related losses in a well treatment fluid. In general, the compositions include a copolymer that includes one or more vinylphosphonic acid ("VPA") monomers.

12 Claims, No Drawings

POLYMER BLENDS FOR STIMULATION OF OIL AND GAS WELLS

CROSS-REFERENCE TO RELATED APPLICATION

The present application claims the benefit of priority under 35 U.S.C. § 119(e) of U.S. Provisional Application Ser. No. 62/394,342, filed on Sep. 14, 2016, the entire disclosure of which is incorporated herein by reference.

BACKGROUND

Aqueous treatment fluids may be used in a variety of subterranean treatments. Such treatments include, but are not limited to, drilling operations, stimulation operations, and completion operations. As used herein, the term "treatment," or "treating," refers to any subterranean operation that uses a fluid in conjunction with a desired function and/or for a desired purpose. The term "treatment," or "treating," does not imply any particular action by the fluid.

Viscous gelled fracturing fluids are commonly utilized in the hydraulic fracturing of subterranean zones (e.g., an oil or gas bearing strata) penetrated by well bores to increase the production of hydrocarbons from the subterranean zones. That is, a viscous fracturing fluid is pumped through the well bore into a subterranean zone to be stimulated at a rate and pressure such that fractures are formed and extended into the subterranean zone. The fracturing fluid also carries particulate proppant material, e.g., graded sand, into the formed fractures. The proppant material is suspended in the viscous fracturing fluid so that the proppant material is deposited in the fractures when the viscous fracturing fluid is broken and recovered. The proppant material functions to prevent the fractures from closing whereby conductive channels are formed through which produced fluids can flow to the well bore.

An example of a stimulation operation utilizing an aqueous treatment fluid is hydraulic fracturing. In some instances, a fracturing treatment involves pumping a proppant-free, aqueous treatment fluid (known as a pad fluid) into a subterranean formation faster than the fluid can escape into the formation so that the pressure in the formation rises and the formation breaks, creating or enhancing one or more fractures. Enhancing a fracture includes enlarging a pre-existing fracture in the formation. Once the fracture is formed or enhanced, proppant particulates are generally placed into the fracture to form a proppant pack that may prevent the fracture from closing when the hydraulic pressure is released, forming conductive channels through which fluids may flow to the well bore.

During the pumping of the aqueous treatment fluid into the well bore, a considerable amount of energy may be lost due to friction between the aqueous treatment fluid in turbulent flow and the formation and/or tubular goods (e.g., pipes, coiled tubing, etc.) disposed within the well bore. As a result of these energy losses, additional horsepower may be necessary to achieve the desired treatment. To reduce these energy losses, friction reducing polymers have heretofore been included in aqueous treatment fluids. The friction reducing polymer should reduce the frictional losses due to friction between the aqueous treatment fluid in turbulent flow and the tubular goods and/or the formation.

Crosslinked guar derivatives and other polymer systems have been used in aqueous treatment fluids for more than 30 years. At present, good crosslinking performance at high temperature (~275° F.) can be obtained by using guar derivatives, such as CMHPG, at a concentration of about 30-40 lb/1000 gal.

However, relatively high polymer usage in subterranean treatment methods can result in significant formation damage. Further, when the treatment fluid is recycled above ground, the high levels of high molecular weight polymers in the fluid can lead to flocculation in above ground fluid recycle operations such as terminal upsets. It is desirable to use as little polymer as possible in a fracturing fluid so that the overall cost of the fracturing job is lower, less polymer residue remains in the fracture and the sand pack after breaking, and formation damage is minimized. There is a need in the art for polymer systems that will allow for improved efficiency in treatment fluids for subterranean zones, overcoming the above-described issues.

SUMMARY

The present disclosure provides methods for fracturing a subterranean formation that include the step of injecting an aqueous fracturing fluid into at least a portion of the subterranean formation at pressures sufficient to fracture the formation, wherein the fracturing fluid has a pH ranging from about 6 to about 11 and includes a crosslinking agent and a copolymer comprising one or more vinylphosphonic acid monomers.

In an embodiment, the copolymer further includes one or more acrylamide monomers. In another embodiment, the copolymer further includes one or more acrylic acid monomers. In another embodiment, the fracturing fluid further includes one or more polysaccharides.

In an embodiment, the crosslinking agent is selected from titanium, zirconium, and boron crosslinking agents. In another embodiment, the crosslinking agent includes a zirconium crosslinking agent selected from zirconium lactate, zirconium lactate triethanolamine, triethanolamine zirconate, zirconium carbonate, zirconium acetylacetonate, zirconium malate, zirconium citrate, and polyhydroxy complexes of zirconium.

In an embodiment, the weight average molecular weight of the copolymer ranges from about 100,000 to about 20,000,000 Daltons.

In an embodiment, the fracturing fluid further includes a proppant.

In an embodiment, the method further includes injecting a breaker into at least a portion of the subterranean formation.

In an embodiment, the fracturing fluid is selected from fresh water, sea water, brines, salt water, produced water, recycled water, industrial waste water, waste water associated with oil production, and combinations thereof.

Also presented is a method for reducing friction-related losses in a well treatment fluid, wherein the method includes the step of adding to the well treatment fluid a friction reducing copolymer that includes one or more vinylphosphonic acid monomers, in an amount effective to improve the flow of the treatment fluid as compared with an identical treatment fluid absent the friction reducing copolymer.

In an embodiment, the method further includes the step of adding one or more polysaccharides to the well treatment fluid before, after or with addition of the friction reducing copolymer. In an embodiment, the one or more polysaccharides are selected from derivatized guar, non-derivatized guar, starches, cellulose derivatives, and combinations thereof.

DETAILED DESCRIPTION

The present disclosure provides compositions and methods for fracturing a subterranean formation. Also provided are compositions and methods for reducing friction-related losses in a well treatment fluid. In general, the compositions include a copolymer that includes one or more vinylphosphonic acid ("VPA") monomers. In an embodiment, the copolymer has such VPA monomer(s) incorporated in the polymer backbone and/or is terminated by such VPA monomer(s). Use of the compositions according to the present disclosure can decrease the amount of total polymer loading by 20-30% or more compared to a state of the art fracturing fluid employed in the industry.

As used herein, the terms "vinylphosphonic" and "vinylphosphonate" are meant to include vinylphosphonic acid derivatives, such as the corresponding alkyl esters, which the term "vinylphosphonate" is meant to encompass.

As used herein, the term "polymer" is meant to encompass oligomer, and includes, without limitation, both homopolymers and copolymers.

As used herein, the term "copolymer," is not limited to polymers containing two types of monomeric units, but includes any combination of two or more monomeric units, e.g., terpolymers, tetrapolymers, and the like.

In an embodiment, a composition of the present disclosure is a water-in-oil emulsion, which includes an oil continuous phase and an aqueous dispersed phase. In an embodiment, the copolymer that includes one or more VPA monomers is present in the aqueous phase.

The oil phase (O) and the aqueous phase (A) can be present at an O/A ratio, based on the volume of each phase of from at least about 1:8, in some cases at least about 1:6 and in other cases at least about 1:4 and can be up to about 10:1, in some cases up to about 8:1 and in other cases up to about 6:1. When the O/A ratio is too oil heavy, the polymer may be too concentrated in the aqueous phase. When the O/A ratio is too water heavy, the emulsion may become unstable and prone to separate. The O/A ratio can be any ratio or range between any of the ratios recited above.

In the present water-in-oil emulsion, the oil phase is present as a continuous phase and includes an inert hydrophobic liquid. The inert hydrophobic liquid can include, as non-limiting examples, paraffinic hydrocarbons, napthenic hydrocarbons, aromatic hydrocarbons, benzene, xylene, toluene, mineral oils, kerosenes, naphthas, petrolatums, branch-chain isoparaffinic solvents, branch-chain hydrocarbons, saturated, linear, and/or branched paraffin hydrocarbons and combinations thereof. Particular non-limiting examples include natural, modified or synthetic oils such as the branch-chain isoparaffinic solvent available as ISOPAR® M and EXXATE® available from ExxonMobile Corporation, Irving Tex., a narrow fraction of a branch-chain hydrocarbon available as KENSOL® 61 from Witco Chemical Company, New York, N.Y., mineral oil, available commercially as BLANDOL® from Witco, CALUME™ LVP-100 available from Calumet Specialty Products, Burnham, Ill., DRAKEOL® from Penreco Partnership, Houston, Tex., MAGIESOL® from Magie Bros., Oil City, Pa. and vegetable oils such as canola oil, coconut oil, rapeseed oil and the like.

The inert hydrophobic liquid is present in the water-in-oil emulsion in an amount sufficient to form a stable emulsion. In some embodiments, the inert hydrophobic liquid can be present in the water-in-oil emulsions in an amount in the range of from about 15% to about 80% by weight.

In certain embodiments, the inert hydrophobic liquid is present in the water-in-oil emulsion at a level of at least about 15, in some cases at least about 17.5, and in other cases at least about 20 weight percent based on the weight of the water-in-oil emulsion and can be present at up to about 80, in some cases up to about 60, in other cases up to about 40 and in some instances up to about 30 weight percent based on the weight of the water-in-oil emulsion. The total amount of inert hydrophobic liquid in the water-in-oil emulsion can be any value or can range between any of the values recited above.

In an embodiment, the copolymer further includes one or more acrylamide monomers.

In an embodiment, the copolymer further includes one or more acrylic acid monomers. As used herein, the terms "acrylic" and "acrylate" are meant to include both acrylic acid derivatives, such as the corresponding alkyl esters often referred to as acrylates, which the term "acrylate" is meant to encompass, and corresponding salts of acrylic acid, non-limiting examples being sodium, potassium and ammonium.

In an embodiment, the fracturing fluid further includes one or more polysaccharides. In one embodiment, the polysaccharide is selected from derivatized guar, non-derivatized guar, starches, cellulose derivatives, and combinations thereof. Guar comes from guar gum, the mucilage found in the seed of the leguminous plant *Cyamopsis tetragonolobus*. The water soluble fraction (85%) is called "guaran," which consists of linear chains of (1,4)-β-D mannopyranosyl units with α-D-galactopyranosyl units attached by (1,6) linkages. The ratio of D-galactose to D-mannose in guaran is about 1:2. Guar gum typically has a weight average molecular weight of between 2,000,000 and 5,000,000 Daltons. In one embodiment, the derivatized guar of the present disclosure includes but is not limited to hydroxypropylguar (HPG), carboxymethylguar (CMG), hydroxyethyl guar (HEG), carboxymethylhydroxypropyl guar (CMHPG), hydroxybutyl guar (HBG), cationic guar, hydrophobically modified guar (HMG), hydrophobically modified carboxymethylguar (HMCMG), hydrophobically modified hydroxyethylguar (HMHEG), hydrophobically modified hydroxypropylguar (HMHPG), hydrophobically modified carboxymethylhydroxypropylguar (HMCMHPG), hydrophobically modified hydroxybutyl guar (HMHBG), and hydrophobically modified cationic guar (HMCG). In an embodiment, the polysaccharide is CMHPG.

In an embodiment, the weight average molecular weight of the copolymer ranges from about 100,000 to about 20,000,000 Daltons. In another embodiment, the weight average molecular weight of the copolymer ranges from about 500,000 to about 15,000,000 Daltons. In another embodiment, the weight average molecular weight of the copolymer ranges from about 1,000,000 to about 10,000,000 Daltons.

In an embodiment, a method for fracturing a subterranean formation is provided, wherein the method includes the step of injecting an aqueous fracturing fluid into at least a portion of the subterranean formation at pressures sufficient to fracture the formation, wherein the fracturing fluid has a pH ranging from about 6 to about 11 (or any value within this range) and includes a crosslinking agent and a copolymer that includes one or more vinylphosphonic acid monomers. In an embodiment, the pH ranges from about 8 to about 10 (or any value within this range).

The crosslinking agents utilized in the present disclosure include but are not limited to copper compounds, magnesium compounds, boron compounds, glyoxal, zirconium compounds, titanium compounds (for example, titanium IV compounds such as titanium lactate, titanium malate, titanium citrate, titanium ammonium lactate, polyhydroxy complexes of titanium, titanium triethanolamine, and titanium acetylacetonate), calcium compounds, aluminum compounds (such as, for example, aluminum lactate or aluminum citrate), p-benzoquinone, dicarboxylic acids and their salts, phosphite compounds and phosphate compounds. In another embodiment, the crosslinking agent is a chemical compound containing a polyvalent ion such as, but not necessarily limited to, boron or a metal such as chromium, iron, aluminum, titanium, antimony and zirconium, or mixtures of polyvalent ions.

In one embodiment, the crosslinking agent is selected from borax, boric acid, boron ores (e.g. colemanite, ulexite, and the like) and combinations thereof. In another embodiment, the crosslinking agent is a zirconium compound. Zirconium compounds can include but are not limited to zirconium acetyl acetonate, zirconium triisopropylamine, zirconium triisopropylamine lactate, zirconium diisopropylamine, zirconium diisopropylamine lactateis and zirconium (IV) compounds such as zirconium lactate, zirconium lactate triethanolamine, triethanolamine zirconate, zirconium carbonate, zirconium acetylacetonate, zirconium malate, zirconium citrate, and polyhydroxy complexes of zirconium. In an embodiment, the crosslinking agent is selected from titanium, zirconium, and boron crosslinking agents.

Well treatment fluid compositions of the present disclosure can optionally include other additives. Additives are generally included to enhance the stability of the fluid composition itself to prevent breakdown caused by exposure to oxygen, high temperature, trace transition metal ions, constituents of water added to the fluid composition, and to prevent non-optimal crosslinking reaction kinetics. The choice of components used in fluid compositions is dictated to a large extent by the properties of the hydrocarbon-bearing formation on which they are to be used. Such additives can be selected from water, oils, salts (including organic salts), polymers, biocides, corrosion inhibitors and dissolvers, pH modifiers/buffers (e.g., acids and bases), breakers, oxidizers, metal chelators, metal complexors, antioxidants, wetting agents, polymer stabilizers, clay stabilizers, scale inhibitors and dissolvers, wax inhibitors and dissolvers, asphaltene precipitation inhibitors, water flow inhibitors, fluid loss additives, chemical grouts, diverters, sand consolidation chemicals, proppants, permeability modifiers, viscoelastic fluids, gases (e.g., nitrogen and carbon dioxide), and foaming agents.

In one embodiment, the method of the present disclosure includes adding a gel breaker or oxidizer such as perborate, peroxide, persulfate, enzymes, and the like.

In an embodiment, the fracturing fluid is selected from fresh water, sea water, brines, salt water, produced water, recycled water, industrial waste water, waste water associated with oil production, and combinations thereof.

Also provided is a method for reducing friction-related losses in a well treatment fluid, wherein the method includes the step of adding to the well treatment fluid a friction reducing copolymer that includes one or more vinylphosphonic acid monomers, in an amount effective to improve the flow of the treatment fluid as compared with an identical treatment fluid absent the friction reducing copolymer.

In an embodiment, the method further includes the step of adding one or more polysaccharides to the well treatment fluid before, after or with addition of the friction reducing copolymer.

While specific embodiments are discussed, the specification is illustrative only and not restrictive. Many variations of this disclosure will become apparent to those skilled in the art upon review of this specification.

Unless defined otherwise, all technical and scientific terms used herein have the same meaning as is commonly understood by one of skill in the art to which this specification pertains.

As used in the specification and claims, the singular form "a", "an" and "the" includes plural references unless the context clearly dictates otherwise.

As used herein, and unless otherwise indicated, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 50%, 20%, 15%, 10%, 9%, 8%, 7%, 6%, 5%, 4%, 3%, 2%, 1%, 0.5%, or 0.05% of a given value or range.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

The present disclosure will further be described by reference to the following examples. The following examples are merely illustrative and are not intended to be limiting. Unless otherwise indicated, all percentages are by weight of the total composition.

EXAMPLE 1

Polyacrylamide Solution

A 1% polyacrylamide solution was prepared by dissolving 5 grams of polyacrylamide (molecular weight 5-6 million) in 500 ml DI water. Then, 0.15 g of sodium bicarbonate and 0.5 ml of 50% choline chloride solution were added. The solution was slowly mixed until the polymer was completely dissolved. The viscosity of the polymer solution was 22 cP (measured using OFITE model 900 viscometer at 511/sec).

The polymer solution was crosslinked by adding 0.2 ml of 30% sodium thiosulfate solution to 100 ml of the polymer solution, adjusting the pH to ~7.8 and adding 0.075 ml of zirconium lactate crosslinker (5% Zr). The resulting solution was transferred to a High Temperature, High Pressure viscometer ("HTHP viscometer") and heated to 275° F. Viscosity was measured as a function of time and temperature. The results are presented in Table 1.

TABLE 1

Viscosity measurements for crosslinked polyacrylamide solution.

| Time (min) | 0 | 5 | 10 | 15 | 20 | 30 | 60 | 90 | 120 |
|---|---|---|---|---|---|---|---|---|---|
| T (° F.) |  | 75 | 96 | 232 | 269 | 271 | 272 | 272 | 272 |
| Viscosity, cP @ 100/sec |  | 32 | 24 | 12 | 11 | 11 | 10 | 12 | 15 |

As seen from Table 1, the viscosity after adding crosslinker did not change significantly compared with the pre-crosslink viscosity (22 cP) and decreased when the temperature increased to 275° F.

EXAMPLE 2

VPA Copolymers

Several VPA-containing copolymers were synthesized (Table 2) and their crosslinked viscosity performance studied.

TABLE 2

VPA Copolymers.

| Copolymer | Composition | Reduced viscosity, dl/gm @ polymer concentration of 0.0167 gm/dl |
|---|---|---|
| VPA-1 | 30% water-in-oil emulsion copolymer with copolymer composition of 99.99% acrylamide and 0.01% vinyl phosphonic acid | 24.3 |
| VPA-2 | 30% water-in-oil emulsion copolymer with copolymer composition of 99.9% acrylamide and 0.1% vinyl phosphonic acid | 22.3 |
| VPA-3 | 30% water-in-oil emulsion copolymer with copolymer composition of 99% acrylamide and 1% vinyl phosphonic acid | 26.7 |
| VPA-4 | 30% water-in-oil emulsion terpolymer with terpolymer composition of 94% acrylamide/5% acrylic acid/1% vinyl phosphonic acid | 18.4 |
| VPA-5 | 30% water-in-oil emulsion terpolymer with terpolymer composition of 69.3% acrylamide/29.7% acrylic acid/1% vinyl phosphonic acid | 16.5 |

A 1% VPA-1 copolymer solution was prepared by dissolving 5 g of VPA-1 copolymer emulsion in 500 ml DI water. Then, 0.15 g sodium bicarbonate and 0.5 ml of 50% choline chloride solution were added. 0.5 ml of ethoxylated surfactant was added as an inverting surfactant. The solution was slowly mixed until the polymer was completely dissolved. The viscosity of the polymer solution was 15 cP (measured using OFITE model 900 viscometer at 511/sec).

The polymer solution was crosslinked by adding 0.2 ml of 30% sodium thiosulfate solution to 100 ml of the polymer solution, adjusting the pH to ~7.6, followed by adding 0.075 ml of zirconium lactate crosslinker (5% Zr). The resulting solution was transferred to an HTHP viscometer and heated to 275° F. Viscosity was measured as a function of time and temperature. The results are presented in Table 3.

TABLE 3

Viscosity measurements for crosslinked VPA-1 copolymer solution.

| Time (min) | 0 | 5 | 10 | 15 | 20 | 30 | 60 | 90 | 120 |
|---|---|---|---|---|---|---|---|---|---|
| T (° F.) | 75 | 173 | 265 | 268 | 268 | 268 | 268 | 268 | 268 |
| Viscosity, cP @ 100/sec | 17 | 344 | 178 | 173 | 160 | 136 | 157 | 160 | 157 |

A 1% VPA-2 copolymer solution was prepared by dissolving 5 g of VPA-2 copolymer emulsion in 500 ml DI water. Then, 0.15 g sodium bicarbonate and 0.5 ml of 50% choline chloride solution were added. 0.5 ml of ethoxylated surfactant was added as an inverting surfactant. The solution was slowly mixed until the polymer was completely dissolved. The viscosity of the polymer solution was 11-12 cP (measured using OFITE model 900 viscometer at 511/sec).

The polymer solution was crosslinked by adding 0.2 ml of 30% sodium thiosulfate solution to 100 ml of the polymer solution, adjusting the pH was adjusted to ~8.0, followed by adding 0.05 ml of zirconium lactate crosslinker (5% Zr). The resulting solution was transferred to an HTHP viscometer and heated to 275° F. Viscosity was measured as a function of time and temperature. The results are presented in Table 4.

TABLE 4

Viscosity measurements for crosslinked VPA-2 copolymer solution.

| Time (min) | 0 | 5 | 10 | 15 | 20 | 30 | 60 | 90 | 120 |
|---|---|---|---|---|---|---|---|---|---|
| T (° F.) | 80 | 167 | 265 | 269 | 269 | 269 | 269 | 269 | |
| Viscosity, cP @ 100/sec | 253 | 312 | 248 | 254 | 242 | 205 | 243 | 242 | |

A 1% VPA-3 copolymer solution was prepared by dissolving 5 g of VPA-3 copolymer emulsion in 500 ml DI water. Then, 0.15 g sodium bicarbonate and 0.5 ml of 50% choline chloride solution were added. 0.5 ml of ethoxylated surfactant was added as an inverting surfactant. The solution was slowly mixed until the polymer was completely dissolved. The viscosity of the polymer solution was 15-16 cP (measured using OFITE model 900 viscometer at 511/sec).

The polymer solution was crosslinked by adding 0.2 ml of 30% sodium thiosulfate solution to 100 ml of the polymer solution, adjusting the pH to ~8.0, followed by adding 0.05 ml of zirconium lactate crosslinker (5% Zr). The resulting solution was transferred to an HTHP viscometer and heated to 275° F. Viscosity was measured as a function of time and temperature. The results are presented in Table 5.

TABLE 5

Viscosity measurements for crosslinked VPA-3 copolymer solution.

| Time (min) | 0 | 5 | 10 | 15 | 20 | 30 | 60 | 90 | 120 |
|---|---|---|---|---|---|---|---|---|---|
| T (° F.) | 68 | 115 | 245 | 266 | 268 | 268 | 268 | 268 | 268 |
| Viscosity, cP @ 100/sec | 500 | 105 | 48 | 40 | 32 | 25 | 20 | 16 | 16 |

Examples 1 and 2 demonstrate that incorporation of even small amounts of vinyl phosphonic acid in the acrylamide copolymer (Example 2) significantly increases the viscosity after a crosslinker has been added compared with polyacrylamide (Example 1) for which there was no significant increase in the viscosity after adding the crosslinker.

EXAMPLE 3

VPA-3 pH Study

A 1% VPA-3 copolymer solution was prepared by dissolving 5 g of VPA-3 copolymer emulsion in 500 ml DI water. Then, 0.15 g of sodium bicarbonate and 0.5 ml of 50% choline chloride solution were added. 0.5 ml of ethoxylated surfactant was added as an inverting surfactant. The solution was slowly mixed until the polymer was completely dissolved. The viscosity of the polymer solution was 15-16 cP (measured using OFITE model 900 viscometer at 511/sec).

The polymer solution was crosslinked by adding 0.2 ml of 30% sodium thiosulfate solution to 100 ml of the polymer solution, adjusting the pH to ~4.7, followed by adding 0.1 ml of zirconium lactate crosslinker (5% Zr). The resulting solution was transferred to an HTHP viscometer and heated to 275° F. Viscosity was measured as a function of time and temperature. The results are presented in Table 6.

TABLE 6

Viscosity measurements for crosslinked VPA-3 copolymer solution (pH ~4.7).

| Time (min) | 0 | 5 | 10 | 15 | 20 | 30 | 60 | 90 | 120 |
|---|---|---|---|---|---|---|---|---|---|
| T (° F.) | 75 | 130 | 255 | 267 | 268 | 268 | 268 | 268 | |
| Viscosity, cP @ 100/sec | 54 | 36 | 25 | 23 | 23 | 17 | 15 | 14 | |

A 1% VPA-3 copolymer solution was prepared by dissolving 5 g of VPA-3 copolymer emulsion in 500 ml DI water. Then, 0.15 g of sodium bicarbonate and 0.5 ml of 50% choline chloride solution were added. 0.5 ml of ethoxylated surfactant was added as an inverting surfactant. The solution was slowly mixed until the polymer was completely dissolved. The viscosity of the polymer solution was 15-16 cP (measured using OFITE model 900 viscometer at 511/sec).

The polymer solution was crosslinked by adding 0.2 ml of 30% sodium thiosulfate solution to 100 ml of the polymer solution, adjusting the pH to ~9.2, followed by adding 0.1 ml of zirconium lactate crosslinker (5% Zr). The resulting solution was then transferred to an HTHP viscometer and heated to 275° F. Viscosity was measured as a function of time and temperature. The results are presented in Table 7.

TABLE 7

Viscosity measurements for crosslinked VPA-3 copolymer solution (pH ~9.2).

| Time (min) | 0 | 5 | 10 | 15 | 20 | 30 | 60 | 90 | 120 |
|---|---|---|---|---|---|---|---|---|---|
| T (° F.) | 80 | 147 | 245 | 268 | 272 | 273 | 273 | 273 | 273 |
| Viscosity, cP @ 100/sec | 17 | 283 | 32 | 45 | 436 | 437 | 365 | 318 | 278 |

Example 3 indicates that the VPA containing copolymers can be used to increase the viscosity over a wide range of pH from 4 to 10.

EXAMPLE 4

Polysaccharide and VPA Copolymer Study

A polysaccharide solution ("Solution 1") was prepared by adding 1.5 g of carboxymethyl hydroxypropyl guar ("CMHPG") to 500 ml of DI water. Then, 0.075 g of sodium bicarbonate and 0.5 ml of 30% choline chloride solution were added. The pH of the solution was adjusted to between 5 to 7, and the CMHPG was allowed to hydrate for a minimum of 30 minutes. The viscosity of the solution was about 17-18 cP at 511/sec at 75° F.

A 1% VPA-3 copolymer solution ("Solution 2") was prepared by dissolving 5 g of VPA-3 copolymer emulsion in 500 ml DI water. Then, 0.15 g of sodium bicarbonate and 0.5 ml of 50% choline chloride solution were added. 0.5 ml of ethoxylated surfactant was added as an inverting surfactant. The solution was slowly mixed until the polymer was completely dissolved. The viscosity of the polymer solution was about 13 cP (measured using OFITE model 900 viscometer at 511/sec).

Solutions 1 and 2 were combined in various amounts to make 100 g of the combined solution. Then, 0.3 ml of 30% sodium thiosulfate was added. The pH was adjusted to about 9-9.5 using 12.5% sodium sesquicarbonate solution. Finally, 0.1 ml of a zirconium lactate crosslinker (~5% Zr content) was added. The combined solution was transferred to an HTHP viscometer and heated to 275° F. Viscosity was measured as a function of time and temperature. The viscosity of the crosslinked system at different mix ratios is provided in Table 8.

TABLE 8

Viscosity measurements for combinations of Solutions 1 and 2 crosslinked with zirconium lactate as crosslinker.
Viscosity, cP measured at 100/sec.

| Time (min) | T (° F.) | 100% Solution 1 | 75% Solution 1 and 25% Solution 2 | 50% Solution 1 and 50% Solution 2 | 25% Solution 1 and 75% Solution 2 | 100% Solution 2 |
|---|---|---|---|---|---|---|
| 0 | 75 | 38 | 34 | 28 | 23 | 17 |
| 5 | 147 | 110 | 156 | 148 | 273 | 283 |
| 10 | 237 | 162 | 148 | 103 | 60 | 32 |
| 15 | 269 | 167 | 223 | 342 | 563 | 45 |
| 20 | 271 | 162 | 229 | 409 | 680 | 436 |
| 25 | 271 | 148 | 225 | 432 | 641 | 425 |
| 30 | 271 | 146 | 225 | 463 | 577 | 437 |
| 60 | 271 | 90 | 171 | 412 | 440 | 365 |
| 90 | 272 | 54 | 146 | 362 | 391 | 318 |
| 120 | 272 | 32 | 127 | 327 | 321 | 278 |

As shown in Table 8, there is synergy in crosslinking mixtures of Solutions 1 and 2. For example, the combination containing 25% Solution 1 and 75% Solution 2 exhibits higher viscosity than Solution 1 or Solution 2 alone.

A polysaccharide solution ("Solution 3") was prepared by adding 1.2 g of CMHPG to 500 ml of DI water. Then, 0.075 g of sodium bicarbonate and 0.5 ml of 30% choline chloride solution were added. The pH of the solution was adjusted to between 5 to 7, and the CMHPG was allowed to hydrate for a minimum of 30 minutes. The viscosity of the solution was about 13-14 cP at 511/sec at 75° F.

A 0.8% VPA-4 copolymer solution ("Solution 4") was prepared by dissolving 4 g of VPA-4 copolymer emulsion in 500 ml DI water. Then, 0.15 g of sodium bicarbonate and 0.5 ml of 50% choline chloride solution were added. The solution was slowly mixed until the polymer was completely dissolved. The viscosity of the polymer solution was about 15-16 cP (measured using OFITE model 900 viscometer at 511/sec).

Solutions 3 and 4 were combined in various amounts to make 100 g of the combined solution. Then, 0.3 ml of 30% sodium thiosulfate was added. The pH was adjusted to about 9-9.5 using 12.5% sodium sesquicarbonate solution. Finally, 0.15 ml of a zirconium lactate crosslinker (~5% Zr content) was added. The combined solution was transferred to an HTHP viscometer and heated to 275° F. Viscosity was measured as a function of time and temperature. The viscosity of the crosslinked system at different mix ratios is provided in Table 9.

TABLE 9

Viscosity measurements for combinations of Solutions 3 and 4 crosslinked with zirconium lactate as crosslinker. Viscosity, cP measured at 100/sec.

| Time (min) | T (° F.) | 100% Solution 3 | 75% Solution 3 and 25% Solution 4 | 50% Solution 3 and 50% Solution 4 | 25% Solution 3 and 75% Solution 4 | 10% Solution 3 and 90% Solution 4 | 100% Solution 4 |
|---|---|---|---|---|---|---|---|
| 0 | 70 | 21 | 20 | 15 | 15 | 17 | 17 |
| 5 | 130 | 70 | 60 | 179 | 216 | 92 | 13 |
| 10 | 253 | 80 | 68 | 151 | 272 | 46 | 375 |
| 15 | 271 | 71 | 69 | 238 | 533 | 77 | 500 |
| 20 | 272 | 81 | 98 | 292 | 530 | 365 | 531 |
| 25 | 272 | 86 | 152 | 310 | 518 | 600 | 530 |
| 30 | 272 | 78 | 160 | 320 | 545 | 626 | 530 |
| 60 | 272 | 60 | 255 | 346 | 458 | 541 | 478 |
| 90 | 272 | 43 | 257 | 300 | 403 | 493 | 416 |
| 120 | 271 | 33 | 235 | 291 | 364 | 450 | 375 |

As shown in Table 9, synergy is exhibited in the viscosity.

A polysaccharide solution ("Solution 5") was prepared by adding 1.2 g of CMHPG to 500 ml of DI water. Then, 0.075 g of sodium bicarbonate and 0.5 ml of 30% choline chloride solution were added. The pH of the solution was adjusted to between 5 to 7, and the CMHPG was allowed to hydrate for a minimum of 30 minutes. The viscosity of the solution was about 13-14 cP at 511/sec at 75° F.

A 0.8% VPA-5 copolymer solution ("Solution 6") was prepared by dissolving 4 g of VPA-4 copolymer emulsion in 500 ml DI water. Then, 0.15 g of sodium bicarbonate and 0.5 ml of 50% choline chloride solution were added. The solution was slowly mixed until the polymer was completely dissolved. The viscosity of the polymer solution was about 15-16 cP (measured using OFITE model 900 viscometer at 511/sec).

Solutions 5 and 6 were combined in various amounts to make 100 g of the combined solution. Then, 0.3 ml of 30% sodium thiosulfate was added. The pH was adjusted to about 9-9.5 using 12.5% sodium sesquicarbonate solution. Finally, 0.15 ml of a zirconium lactate crosslinker (~5% Zr content) was added. The combined solution was transferred to an HTHP viscometer and heated to 275° F. Viscosity was measured as a function of time and temperature. The viscosity of the crosslinked system at different mix ratios is provided in Table 10.

TABLE 10

Viscosity measurements for combinations of Solutions 5 and 6 crosslinked with zirconium lactate as crosslinker. Viscosity, cP measured at 100/sec.

| Time (min) | T (° F.) | 100% Solution 5 | 75% Solution 5 and 25% Solution 6 | 50% Solution 5 and 50% Solution 6 | 25% Solution 5 and 75% Solution 6 | 100% Solution 6 |
|---|---|---|---|---|---|---|
| 0 | 70 | 21 | 30 | 30 | 43 | 51 |
| 5 | 129 | 67 | 77 | 343 | 169 | 81 |
| 10 | 253 | 80 | 245 | 401 | 101 | 70 |
| 15 | 271 | 77 | 257 | 430 | 85 | 45 |
| 20 | 272 | 81 | 267 | 441 | 74 | 35 |
| 25 | 272 | 86 | 267 | 437 | 70 | 30 |
| 30 | 272 | 80 | 259 | 413 | 69 | 21 |
| 60 | 272 | 59 | 217 | 278 | 43 | 17 |
| 90 | 272 | 42 | 191 | 196 | 33 | 16 |
| 120 | 272 | 34 | 171 | 147 | 27 | 15 |

EXAMPLE 5

Friction Reduction Study

The friction reduction characteristics of each of the VPA polymers in Table 2 were examined by measuring the pressure drop in a flow loop at a flow rate of 5 gallon/min for a 0.1% emulsion in water and comparing it to the pressure drop for water.

The friction reduction is defined as follows:

% Friction reduction=100×(Pressure drop for water−Pressure drop for solution)/Pressure drop for water The friction reduction for this solution is provided in Table 11.

TABLE 11

Friction reduction performance of various VPA-based polymers measured at an emulsion concentration of 0.1% in water.

| Samples | 0.5 min | 1 min | 2 min | 3 min |
|---|---|---|---|---|
| VPA-1 | 62.9% | 67.1% | 66.4% | 65.7% |
| VPA-2 | 67.4% | 67.4% | 66.7% | 66% |
| VPA-3 | 60.1% | 65.5% | 66.2% | 64.9% |
| VPA-4 | 66.4% | 67.1% | 67.1% | 66.4% |
| VPA-5 | 67.3% | 67.3% | 67.3% | 66.7% |

The disclosed subject matter has been described with reference to specific details of particular embodiments thereof. It is not intended that such details be regarded as limitations upon the scope of the disclosed subject matter except insofar as and to the extent that they are included in the accompanying claims.

Therefore, the exemplary embodiments described herein are well adapted to attain the ends and advantages mentioned as well as those that are inherent therein. The particular embodiments disclosed above are illustrative only, as the exemplary embodiments described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the exemplary embodiments described herein. The exemplary embodiments described herein illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components, substances and steps. As used herein the term "consisting essentially of" shall be construed to mean including the listed components, substances or steps and such additional components, substances or steps which do not materially affect the basic and novel properties of the composition or method. In some embodiments, a composition in accordance with embodiments of the present disclosure that "consists essentially of" the recited components or substances does not include any additional components or substances that alter the basic and novel properties of the composition. If there is any conflict in the usages of a word or term in this specification and one or more patent or other documents that may be incorporated herein by reference, the definitions that are consistent with this specification should be adopted.

We claim:

1. A method for fracturing a subterranean formation, the method comprising the step of injecting an aqueous fracturing fluid into at least a portion of the subterranean formation at pressures sufficient to fracture the formation, wherein the fracturing fluid has a pH ranging from about 6 to about 11 and includes a water-in-oil emulsion comprising a crosslinking agent, an inert hydrophobic liquid and a copolymer comprising one or more vinylphosphonic acid monomers.

2. The method of claim 1, wherein the copolymer further comprises one or more acrylamide monomers.

3. The method of claim 1, wherein the copolymer further comprises one or more acrylic acid monomers.

4. The method of claim 1, wherein the fracturing fluid further comprises one or more polysaccharides.

5. The method of claim 4, wherein the one or more polysaccharides are selected from the group consisting of derivatized guar, non-derivatized guar, starches, cellulose derivatives, and combinations thereof.

6. The method of claim 1, wherein the crosslinking agent is selected from the group consisting of titanium, zirconium, and boron crosslinking agents.

7. The method of claim 1, wherein the crosslinking agent comprises a zirconium crosslinking agent selected from the group consisting of zirconium lactate, zirconium lactate triethanolamine, triethanolamine zirconate, zirconium carbonate, zirconium acetylacetonate, zirconium malate, zirconium citrate, and polyhydroxy complexes of zirconium.

8. The method of claim 1, wherein the weight average molecular weight of the copolymer ranges from about 100,000 to about 20,000,000 Daltons.

9. The method of claim 1, wherein the fracturing fluid further comprises a proppant.

10. The method of claim 1, wherein the method further comprises injecting a breaker into at least a portion of the subterranean formation.

11. The method of claim 1, wherein the fracturing fluid is selected from the group consisting of fresh water, sea water, brines, salt water, produced water, recycled water, industrial waste water, waste water associated with oil production, and combinations thereof.

12. A method for fracturing a subterranean formation, the method comprising the step of injecting an aqueous fracturing fluid into at least a portion of the subterranean formation at pressures sufficient to fracture the formation, wherein the fracturing fluid has a pH ranging from about 6 to about 11 and comprises a crosslinking agent, a polysaccharide, and a copolymer comprising one or more vinylphosphonic acid monomers, wherein the polysaccharide and the copolymer are present at a ratio ranging from 25:75 to 75:25.

* * * * *

UNITED STATES PATENT AND TRADEMARK OFFICE
CERTIFICATE OF CORRECTION

| | | |
|---|---|---|
| PATENT NO. | : 10,982,519 B2 | Page 1 of 1 |
| APPLICATION NO. | : 15/702855 | |
| DATED | : April 20, 2021 | |
| INVENTOR(S) | : Kesavan et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 125 days.

Signed and Sealed this
Tenth Day of January, 2023

*Katherine Kelly Vidal*

Katherine Kelly Vidal
*Director of the United States Patent and Trademark Office*